June 26, 1962
C. E. MOELLER
3,041,387
THERMOCOUPLE WIRE CONNECTION
Filed Oct. 5, 1959
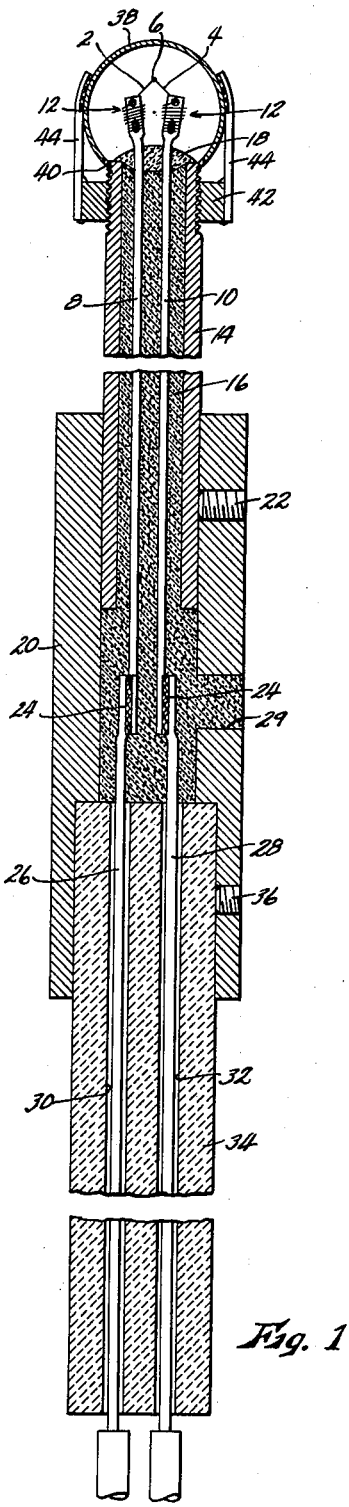
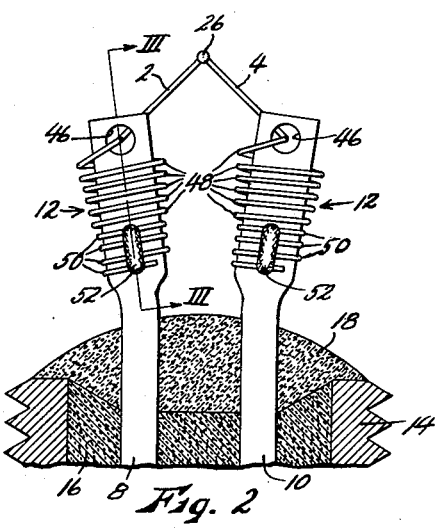
Fig. 2
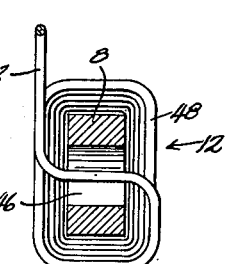
Fig. 4
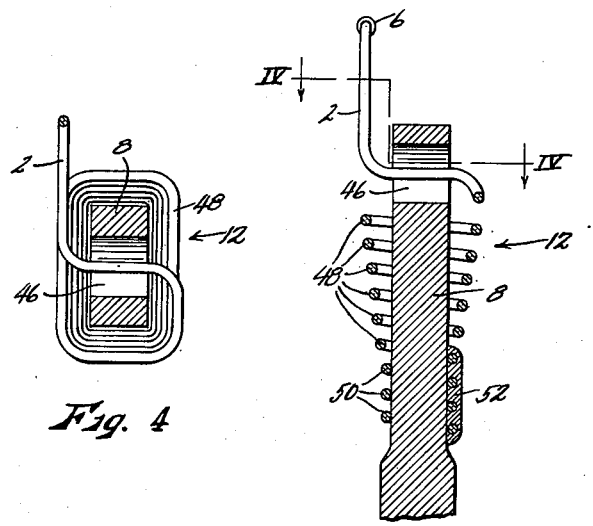
Fig. 3
Fig. 1
INVENTOR.
Calvin E. Moeller
BY John A. Hamilton
Attorney.

United States Patent Office 3,041,387
Patented June 26, 1962

3,041,387
THERMOCOUPLE WIRE CONNECTION
Calvin E. Moeller, Lake Forest,
Bonner Springs, Kans.
Filed Oct. 5, 1959, Ser. No. 844,362
6 Claims. (Cl. 136—4)

This invention relates to new and useful improvements in thermocouples, and has particular reference to a novel mode of connecting the wires forming the "hot" junction of a thermocouple to the studs or posts which support them.

Considerable difficulty has been experienced in providing an efficient connection of thermocouple wires to their supporting studs, particularly in "fine-wire" thermocouples, where said wires may often be as fine as .002 inch in diameter. The actual junction must be disposed at a considerable distance from the studs or any other substantial mass of metal, or other material, in order that the temperature of said junction will not be appreciably altered by conductive or radiant transfer of heat between the junction and said metal masses. Commonly, therefore, the junction is supported only by the thermocouple wires themselves, which cannot have any support for a substantial distance from the junction. Therefore, when the wires are very fine, often as fine as a human hair, the wires adjacent the junction will be flexed, and the junction moved about, by the shocks of handling, and by air currents or by a fluid medium in which the junction is placed to measure the temperature thereof. This movement tends to cause flexure of the wires at the points they are attached to the studs. Commonly the wires are attached to the studs by some type of gripping or clamping device, or by welding. The gripping and clamping devices cause work-hardening of the wires, and the heat of welding causes a loss of temper by crystalline changes therein. In either case, the wires are so embrittled at and adjacent their points of attachment, that any continued or repetitive flexing of said wires at those points soon causes breakage of the wires and destruction of the thermocouple.

Accordingly, an object of the present invention is the provision of a thermocouple wire connection wherein the wire cannot be flexed directly at or adjacent its point of actual affixation to its supporting stud. This is accomplished by means restraining the movement of the wire relative to the stud at a point remote from its point of actual affixation to the stud, said restraint being performed without sharp bending, clamping, heating, or any other operation which could cause said wire to be embrittled.

Another object is the provision of a thermocouple wire connection of the character described wherein sudden or abrupt flexure of the wire is avoided at any point, even where it may not previously have been rendered brittle by work-hardening or heating as previously described. This tends still further to avoid breakage due to fatigue resulting from flexure in normal usage, and is accomplished by provision that the flexure which does occur will be distributed throughout a substantial length of the wire, rather than being concentrated in a restricted zone thereof.

Other objects are simplicity and economy of construction, efficiency and dependability of operation, and adaptability for use in a wide variety of wire connecting applications.

With these objects in view, as well as other objects which will appear in the course of the specification, reference will be had to the drawings, wherein:

FIG. 1 is a longitudinal sectional view, partially broken away, of a thermocouple employing wire connections embodying the present invention, FIG. 2 is an enlarged fragmentary view similar to FIG. 1, showing the hot junction, wire connections and related parts of the element, with the radiation shield removed, FIG. 3 is an enlarged, fragmentary sectional view taken on line III—III of FIG. 2, and FIG. 4 is a sectional view taken on line IV—IV of FIG. 3.

Like reference numerals apply to similar parts throughout the several views, and the numerals 2 and 4 apply respectively to a pair of thermocouple wires welded together at their ends to form the "hot" junction 6 of a thermocouple. These wires are of course made of unlike materials, the well known thermoelectric principle being that when a loop is formed of two wires of unlike materials, and the two junctions of said wires are at unequal temperatures, an electric current proportional to the temperature differential between the junctions will flow around the loop. Therefore by maintaining one junction, commonly known as the "cold" junction, at a known or controlled temperature, and carefully measuring the current flowing, the temperature of the other or "hot" junction may be accurately measured. Only the hot junction element is illustrated in the drawing, it being understood that the actual hot junction 6 is in use placed in the medium the temperature of which is to be measured.

Commonly known materials for the pair of wires are iron and constantan, platinum and platinum-rhodium, etc. The wires are often extremely fine, producing what is usually called a "fine-wire" thermocouple, when a very rapid response is required, the junction then having such a small mass that its temperature changes very rapidly to correspond to that of the surrounding medium. It is in connection with such "fine-wire" that difficulties particularly are experienced in preventing breakage of the wires.

In the element shown, the wires 2 and 4 are respectively connected, at points spaced well apart from junction 6, to the upper ends of a pair of studs 8 and 10. Each of the connections between said wires and said studs is designated generally by the numeral 12, and forms the specific subject matter of the present invention. The studs constitute a pair of wires, each preferably of the same material as the wire 2 or 4 attached thereto, in order that the junction between each wire and its stud will not itself constitute a thermal junction which would generate its own signal and thereby interfere with the accuracy of the thermocouple. Said wires are contained in and supported by a metal tube 14, which must be of a material capable of withstanding the temperatures to which the thermocouple is exposed. The wires are insulated from the tube and from each other by insulating cement 16 filling said tube. The upper end of said tube is sealed by a hard refractory cement 18 to prevent crumbling and deterioration of cement 16. The lower end of tube 14 is secured in a tubular body member 20 by means of a set screw 22, the studs 8 and 10 extending into said body member and being welded respectively therein, as at 24, to a pair of extension lead wires 26 and 28, which are of carefully selected material such that temperature variations at these connections will not change the signal generated at junction 6. The interior of the body member is also filled with insulating cement 16 through inlet opening 29. From the body member, wires 26 and 28 extend outwardly through a pair of holes 30 and 32 formed in a ceramic insulating member 34, which is secured in the body member by a set screw 36. From the insulator 34, the wires extend to the remainder of the thermocouple device, not shown, constituting the "cold" junction, the potentiometer or other current measuring device, etc. Surrounding the hot junction 6 is a radiation shield 38, which in the present illustration constitutes a short, open-ended cylinder formed of platinum or other material capable of withstanding the temperatures to which the junction may be subjected, encompassing junction 6 and with its axis arranged at right angles to the axis of tube 14. Said shield has a hole 40 formed in a wall thereof to receive the upper end of tube 14, and it is supported by means of a nut 42 threaded on tube 14, said shield and nut being interconnected by a pair of wires 44 welded respectively thereto. The primary purpose of the shield is to prevent the temperature of junction 6 from being affected by heat transferred thereto by radiation. Its specific formation and design will of course be determined by the specific application to which the thermocouple is to be placed.

The connection 12 between each of the wires 2 and 4 and its respective stud 8 or 10, and which forms the subject matter of the present invention, is best shown in FIGS. 2, 3 and 4. In making this connection, the wire is first introduced through a hole 46 formed transversely in the extreme end portion of the stud, the portion of the wire actually contained in the hole being spaced substantially apart from junction 6. The hole is several times the diameter of the wire, so as to permit considerable freedom of movement of the wire within the hole, and the wire is curved gradually where it enters and leaves the hole, rather than being bent sharply. If the studs are formed of round wire, the end portions thereof may be flattened as shown for greater convenience and facility in forming the holes, but this is not essential. The holes often may be as small as .008 to .010 inch in diameter. After being passed through hole 46, the wire is wrapped helically around the stud adjacent hole 46. The turns of the wire immediately adjacent hole 46, designated by the numeral 48, are very loosely engaged about the stud and may in fact be spaced apart from the stud as shown to constitute a self-supporting helical coil. The turns of the wire remote from hole 46, designated by the numeral 50, are wrapped tightly about the stud and are rigidly attached thereto by welding as indicated at 52, or in any other suitable manner. If the connection is made by welding, it is preferably made by a resistance welding process, rather than by any process involving the addition or application of extra welding metal. This avoids the possibility that the added metal might form a separate thermoelectric junction at the connection 52, or might contaminate the metal of the wire or stud, either of which would interfere with the accuracy of the signal generated at junction 6.

It will be readily apparent that if junction 6 is caused to move relative to studs 8 and 10 as previously described, either by the shocks of handling, or by currents of air or hot gases impinging thereagainst, or the like, the resulting flexure of wires 2 and 4 will not be transmitted to those portions of the wires at or directly adjacent welds 52, where said wires are embrittled by crystalline changes resulting from the heat of welding. Said embrittlement would occur, by work-hardening, even if the wires were clamped or otherwise gripped rather than being attached by welding. The flexure is insulated from connections 12 since the wire movement is restrained by insertion of the wires in holes 46, and since the wires are secured to the studs only at points remote from said holes.

If all of the turns of the wires were tightly wrapped on the studs, and particularly if the wires fitted very closely in holes 46, the above described separation between the point of flexure of each wire and its point of rigid attachment to the stud would of course be provided, and this is the prime object of this invention. However, in that event the wire would still have one point which would be subjected to rather severe flexure upon movement of junction 6. This would occur at the point of emergence of the wire from the stud hole toward junction 6, since this point would then be held rigidly stationary relative to the stud. Even though this part of the wire has not been embrittled by the heat of welding or the like, repeated flexure will cause fatigue and eventual breakage. To avoid this type of breakage, the holes 46 are made several times the diameter of wires 2 and 4, and the first few turns of each wire about its stud are loose, preferably being spaced apart from the stud to form a self-supporting, resilient helical coil. In this manner, movement of wires 2 and 4 between junction 6 and the studs does not cause sharp flexure of the wires where they enter the studs. Instead, the wire movement is transmitted through holes 46 and into the helical turns 48 of the wires, and is gradually reduced or dampened in the long lengths of wire between holes 46 and the connections 52. Thus the wire flexure is distributed through such a long length of wire that fatigue failure is substantially eliminated, and virtually no appreciable wire movement occurs directly at or adjacent connections 52. Inclusion of the wires in holes 46 limits the wire movement at those points to prevent excessive movement of junction 6, and also retains the coils of the wires in assembly on the studs.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A thermocouple comprising a pair of wires having a junction therebetween, said junction being unsupported except by said wires, a pair of mounting studs, said wires being rigidly affixed respectively to said studs at points of said wires remote from said junction, and means on each of said studs loosely engaging the associated wire at a point intermediate said junction and the rigid connection of said wire, but spaced substantially apart from both, whereby to permit free but limited movement of said wire at that point.

2. A thermocouple comprising a pair of wires having a junction therebetween, said junction being unsupported except by said wires, a pair of elongated mounting studs, said wires being rigidly affixed respectively to said studs at points of said wires remote from said junction, each of said wires having a portion thereof intermediate said junction and the rigid connection thereof formed in a generally helical coil loosely encompassing the associated elongated stud, the convolutions of said coil normally being spaced apart from said stud whereby to permit free but limited movement of said wire relative to said stud.

3. The structure as defined in claim 2 with the addition of means on each of said studs loosely engaging the associated wire between said junction and said coil of said wire, whereby to permit free but limited relative movement of said wire relative to said stud.

4. A thermocouple comprising a pair of wires having a junction therebetween, said junction being unsupported except by said wires, a pair of elongated mounting studs each having a hole formed transversely therethrough, one of said wires extending through the hole of each of said studs at a point of said wire remote from said junction, said wire extending longitudinally along said stud and being rigidly affixed to said stud at a point remote from said hole, said hole being of substantially greater diameter than said wire whereby to permit free but limited movement of said wire relative to said stud at the point it passes through said hole.

5. The structure as recited in claim 4 wherein the hole in each of said studs is of substantially greater diameter than that of the associated wire, whereby to permit substantial transverse movement of said wire within said hole, and wherein said wire is curved at its entry into and exit from said hole to overlap the opposite faces of said stud, in spaced relation from said faces, whereby to limit longitudinal movement of said wire through said hole.

6. The structure as recited in claim 4 wherein the hole in each of said studs is of substantially greater diameter than that of the associated wire, whereby to permit substantial transverse movement of said wire within said hole, and wherein the portion of said wire intermediate said hole and said rigid attachment is formed in a coil loosely encompassing said stud, whereby to permit relative movement between said coil and said stud.

References Cited in the file of this patent

UNITED STATES PATENTS

| | | |
|---|---|---|
| 1,875,241 | Idank | Aug. 30, 1932 |
| 2,284,547 | West | May 26, 1942 |
| 2,485,468 | Wrigley | Oct. 18, 1949 |
| 2,525,439 | Abbott | Oct. 10, 1950 |
| 2,668,279 | Epstein | Feb. 2, 1954 |

FOREIGN PATENTS

| | | |
|---|---|---|
| 557 | Great Britain | Dec. 17, 1914 |
| 7,910 | Great Britain | June 4, 1908 |
| 527,778 | Great Britain | Oct. 16, 1940 |